(No Model.)
B. S. BEAM.
FUNNEL FOR CANNING PURPOSES.
No. 463,473. Patented Nov. 17, 1891.
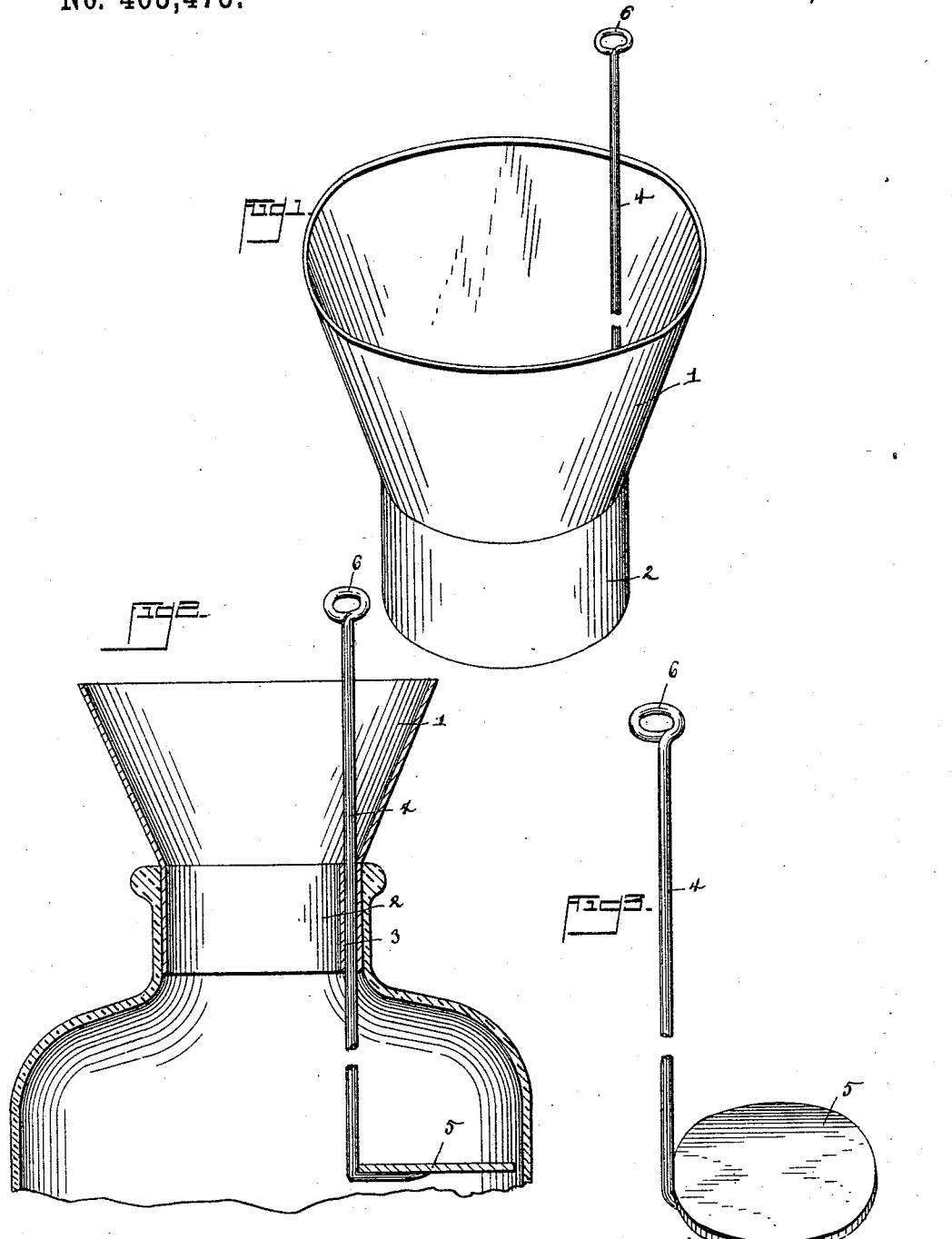
Witnesses:
Chas. A. Ford.
W. S. Duval
Inventor
Belle S. Beam.
By her Attorneys,
C. A. Snow & Co.
THE NORRIS PETERS CO., PHOTO-LITHO., WASHINGTON, D. C.

UNITED STATES PATENT OFFICE.

BELLE S. BEAM, OF STROTHER, MISSOURI.

FUNNEL FOR CANNING PURPOSES.

SPECIFICATION forming part of Letters Patent No. 463,473, dated November 17, 1891.

Application filed June 4, 1891. Serial No. 395,083. (No model.)

*To all whom it may concern:*

Be it known that I, BELLE S. BEAM, a citizen of the United States, residing at Strother, in the county of Monroe and State of Missouri, have invented a new and useful Funnel for Canning Purposes, of which the following is a specification.

This invention relates to funnels; and the objects in view are to provide a funnel especially adapted for use in preserving or canning fruits, vegetables, &c.

A further object in view is to provide means for preventing the heat contained in the goods being canned from cracking the glass jars in which they are canned and for packing the fruit in the jars and expelling all air therefrom.

Referring to the drawings, Figure 1 is a perspective of a funnel constructed in accordance with my invention. Fig. 2 is a vertical longitudinal section of the same, the funnel being in position in a glass jar. Fig. 3 is a detail in perspective of the heat-conducting plunger or rod.

Like numerals of reference indicate like parts in all the figures of the drawings.

In practicing my invention I employ a funnel slightly larger than the mouth of a jar, or so large as will permit of the same being used in connection with a ladle or dipper for filling the jar, while the neck of the funnel, as indicated at 2, is reduced to exactly correspond with the diameter of the mouth of the jar. By employing a funnel thus constructed it will be seen that a large ladle may be employed for filling the jar, and that the disagreeable task of having to subsequently carefully wipe the mouth of the jar after each filling is avoided. The neck is provided upon its inner side with an eye 3, and in the same is mounted a metal plunger or rod 4, the latter preferably having its lower end bent at a right angle and having secured thereto a circular plate 5 of metal. The upper end of the rod, which is above the eye, is bent to form a handle or eye 6.

In practice the funnel is placed in the jar and forced downwardly until when the funnel is in position the plate 5 of the plunger is in contact with the glass bottom of the jar. The fruit is now placed in the jar in the usual manner, and the heat from the same passes to the glass jar and from thence to the metal plate, and by convexion throughout the length of the rod or plunger. In this manner the surplus of heat with which the glass is charged, and which so often results in cracking the same, is absorbed, and with ordinary care, as preventing the jar having contact with sudden drafts, will insure success in the operation and prevent any cracking whatever. After the fruit has sufficiently cooled, the rod 4 is removed or partially withdrawn from the funnel, so that the circular plate 5 lies upon the top of the fruit. By pressing the plate upon the fruit and occasionally partially rotating the rod the fruit is closely packed and all air expelled from below the fruit-line. As the fruit is packed, the preserver may from time to time add more fruit through the funnel, which preferably remains in position during the entire operation of packing. Thus the rod performs a twofold purpose—namely, as a conductor and absorber of heat by convexion and as a packing device.

Having described my invention, what I claim is—

The herein-described funnel adapted to fit the neck of a jar and provided upon its inner side with an eye, and the metal rod rotatably and reciprocatingly mounted in the eye, adapted for adjustment, said rod having its upper end terminating in a handle and its lower end provided with a metal fruit-packing plate, substantially as specified.

In testimony that I claim the foregoing as my own I have hereto affixed my signature in presence of two witnesses.

BELLE S. BEAM.

Witnesses:
A. O. CALHOON,
W. R. BASKETT.